United States Patent
Wu

(10) Patent No.: US 9,661,597 B2
(45) Date of Patent: May 23, 2017

(54) METHOD AND DEVICE FOR DEREGISTERING TERMINAL PERIPHERAL

(71) Applicant: ZTE Corporation, Shenzhen (CN)

(72) Inventor: Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 48 days.

(21) Appl. No.: 14/438,023

(22) PCT Filed: Aug. 12, 2013

(86) PCT No.: PCT/CN2013/081320
§ 371 (c)(1),
(2) Date: Apr. 23, 2015

(87) PCT Pub. No.: WO2014/067313
PCT Pub. Date: May 8, 2014

(65) Prior Publication Data
US 2015/0271775 A1 Sep. 24, 2015

(30) Foreign Application Priority Data
Oct. 29, 2012 (CN) .......................... 2012 1 0419614

(51) Int. Cl.
*H04W 60/06* (2009.01)
*H04W 4/00* (2009.01)
(Continued)

(52) U.S. Cl.
CPC .............. *H04W 60/06* (2013.01); *H04L 69/08* (2013.01); *H04W 4/005* (2013.01); *H04W 76/06* (2013.01); *H04W 88/16* (2013.01)

(58) Field of Classification Search
CPC ..... H04W 4/005; H04W 60/00–60/06; H04W 76/06; H04W 76/068
See application file for complete search history.

(56) References Cited

U.S. PATENT DOCUMENTS

| | | | |
|---|---|---|---|
| 2009/0092045 A1* | 4/2009 | Wu | H04W 60/06 370/230 |
| 2011/0249636 A1 | 10/2011 | Cherian et al. | |
| 2012/0263106 A1* | 10/2012 | Lee | H04W 4/005 370/328 |

FOREIGN PATENT DOCUMENTS

| | | |
|---|---|---|
| CN | 101136942 A | 3/2008 |
| CN | 101594648 A | 12/2009 |

(Continued)

OTHER PUBLICATIONS

International Search Report for corresponding application PCT/CN2013/081320 filed Aug. 12, 2013; Mail date Oct. 31, 2013.

(Continued)

*Primary Examiner* — Pao Sinkantarakorn
(74) *Attorney, Agent, or Firm* — Cantor Colburn LLP

(57) ABSTRACT

A method and device for deregistering a terminal peripheral are provided. The method comprises: a gateway sends the request message for deregistering the terminal peripheral to the terminal peripheral; and the gateway deletes registration information of the terminal peripheral stored by the gateway. By means of the disclosure, the technical problem of the storage resource waste in the related art is solved where the gateway cannot deregister the terminal peripheral, thereby achieving the technical effect of deregistering the terminal peripheral and saving the storage resource.

12 Claims, 4 Drawing Sheets

(51) Int. Cl.
*H04W 76/06* (2009.01)
*H04W 88/16* (2009.01)
*H04L 29/06* (2006.01)

(56) References Cited

FOREIGN PATENT DOCUMENTS

CN 102638797 A 8/2012
EP 2385734 A1 11/2011

OTHER PUBLICATIONS

Supplementary European Search Report No. 13852039 dated Sep. 25, 2015; pp. 7.

* cited by examiner

METHOD AND DEVICE FOR DEREGISTERING TERMINAL PERIPHERAL

TECHNICAL FIELD

The disclosure relates to the field of Communications, including e.g., a method and device for deregistering a terminal peripheral.

BACKGROUND

Machine-to-Machine/Man (M2M) communication belongs to the communication field of communication network which is extended from the existing information communication network. The M2M communication, as a technique in the communication field, is used to acquire kinds of information from the physical world mainly by embedding capabilities of intelligence and communications in various possible objects, and analyze and process the acquired information to enhance and promote the intelligence, interaction and automation degree of the existing information communication network service.

At present, M2M communication network is of various network forms, and may be an independent physical network constructed separately, or a logic network constructed on the existing public communication networks and various government/enterprise private networks.

The M2M communication network can be divided into three layers according to the logic functions: a perception extension layer, a network/service layer, and an application layer. The three layers are described below in detail.

1) The perception extension layer is mainly used to implement the acquisition, automatic identification and intelligent control for the information of the physical world. The various objects per se in the physical world have no communication capability, but can acquire the information in the physical world mainly through intelligent nodes, such as sensors, actuators, intelligent devices and Radio Frequency Identification (RFID) reader-writer, and perform information interaction with the network layer through communication modules. The parts in the M2M gateway involved in this process mainly include M2M terminal devices and M2M gateway devices.

2) The network/service layer is used to support transmitting, routing and controlling of the information in the perception layer, and provides support for communications between human and an object or between different objects in the Internet of Things. Combined with the classification of the Internet of things, the network level is specifically of the following network forms: communication networks, Internet, industry networks, etc. The parts involved in the network/service layer mainly include M2M platform.

3) The application layer mainly includes various specific applications of the Internet of Things, including public services and industry services. The industry services may be public-facing industry public services, or industry dedicated services that satisfy the specific application needs inside the industry. The public services are basic services provided for public-facing common needs, such as smart home and mobile payment. The industry dedicated services are usually the services provided for the interior of the industry for the particular needs of the industry, such as smart grids, intelligent transportation and smart environments, and so on. Part of industry services may also be provided for the public, such as intelligent transportation, called industry public services. The parts involved in the application layer mainly include M2M application server, called M2M application for short.

4) The terminal peripheral refers an individual device having an environmental perception function, and can send the perceived information to the M2 M service platform or the M2M application through an M2M gateway, as well as receive the downlink control on the terminal peripheral from the M2M application or the M2M service platform.

5) Since the processing capability, storage capacity and power supply of the M2M terminal peripheral are somewhat limited, the M2M terminal peripheral cannot communicate with a communication network, and need to access the communication network through a M2M gateway. The M2M gateway may perform protocol conversion between the M2M perception extension layer and the top network. The M2M gateway can aggregate and forward the data information acquired by the M2M terminal peripheral, and further receive the control information from the M2M application or the M2M service platform to manage the terminal peripheral.

The M2M service platform provides common capacities and supports for the M2M applications, and provides open interfaces, so that the M2M applications may access and use the network resources and capacities. Through shielding the specific M2M application from the specific network implementation of the underlayer, the complexity of application development of the Internet of Things can be reduced, and deployment costs of the application development of the Internet of Things can be reduced.

When performing remote management on the terminal peripheral, the M2M service platform or the M2M application should be with the capability to take the initiative to deregister the terminal peripheral. For example, when a certain M2M application service is expired and a user does not renew, the registration information related to the user can be deleted, i.e., unnecessary information does not need to be stored, so as to save the storage space of the M2M service platform or the M2M application. Meanwhile, when the gateway for managing the terminal peripheral needs to be replaced, the old registration information will be further stored in the terminal peripheral. After the old gateway is replaced with the new gateway, the terminal peripheral stores multiple sets of registration information, e.g., multiple identifiers and multiple gateway addresses, which results in that the data cannot be sent and received normally, and storage resource is wasted.

Aiming at the above problem, no effective solution has been presented.

SUMMARY

A method and device for deregistering a terminal peripheral are provided in the Embodiments of the disclosure, so as to at least solve the technical problem of the storage resource waste in the related art where a gateway cannot deregister a terminal peripheral.

According to one aspect of the embodiments of the disclosure, a method for deregistering a terminal peripheral is provided, and the method comprises: sending, by a gateway, a request message for deregistering a terminal peripheral to the terminal peripheral; and deleting, by the gateway, registration information of the terminal peripheral stored by the gateway.

According to an embodiment of the disclosure, the request message for deregistering the terminal peripheral carries indication information which indicates that this message is a request message for deregistering the terminal peripheral, and/or identification information which is used to identify the terminal peripheral of which the registration information needs to be deleted.

According to an embodiment of the disclosure, after the gateway sends the request message for deregistering the terminal peripheral to the terminal peripheral, the method further comprises: the terminal peripheral receiving the request message for deregistering the terminal peripheral; the terminal peripheral deleting registration information of the gateway stored locally; and the terminal peripheral returning a deregistration confirmation message to the gateway.

According to an embodiment of the disclosure, deleting, by the gateway, registration information of the terminal peripheral stored by the gateway comprises: based on that the gateway receives the deregistration confirmation message returned by the terminal peripheral, deleting, by the gateway, the registration information of the terminal peripheral stored by the gateway, wherein the deregistration confirmation message is a message which is returned to the gateway by the terminal peripheral after receiving the request message for deregistering the terminal peripheral.

According to an embodiment of the disclosure, deleting, by the gateway, the registration information of the terminal peripheral stored by the gateway, further comprises: when a predetermined time arrives, deleting, by the gateway, the registration information of the terminal peripheral stored by the gateway.

According to an embodiment of the disclosure, the registration information of the gateway comprises: a gateway identifier of the gateway and/or an identifier and/or address allocated for the terminal peripheral by the gateway. According to an embodiment of the disclosure, the registration information of the terminal peripheral comprises: an identifier of the terminal peripheral and/or an address of the terminal peripheral.

According to an embodiment of the disclosure, before the gateway sends the request message for deregistering the terminal peripheral to the terminal peripheral, the method further comprises: receiving, by the gateway, the request message for deregistering the terminal peripheral sent from a Machine-to-Machine/Man (M2M) service platform and/or an M2M application.

According to an embodiment of the disclosure, after the gateway deletes the registration information of the terminal peripheral stored by the gateway, the method further comprises: sending, by the gateway, a deregistration confirmation message to the M2M service platform and/or the M2M application, wherein the deregistration confirmation message is used to indicate that the gateway has deregistered the terminal peripheral.

According to an embodiment of the disclosure, the gateway is an M2M gateway in an M2M communication system.

According to another aspect of the embodiments of the disclosure, a device for deregistering a terminal peripheral is provided, located in a gateway, and the device comprises: a first sending element, configured to send, a request message for deregistering a terminal peripheral to the terminal peripheral; and a deleting element, configured to delete registration information of the terminal peripheral stored by the gateway.

According to an embodiment of the disclosure, the deleting element is further configured to, based on that the gateway receives a deregistration confirmation message returned by the terminal peripheral, delete the registration information of the terminal peripheral stored by the gateway, wherein the deregistration confirmation message is a message which is returned to the gateway by the terminal peripheral after receiving the request message for deregistering the terminal peripheral and deleting registration information of the gateway stored by the terminal peripheral.

According to an embodiment of the disclosure, the device further comprises: a receiving element, configured to, before the gateway sends the request message for deregistering the terminal peripheral to the terminal peripheral, receive the request message for deregistering the terminal peripheral sent from a Machine-to-Machine/Man (M2M) service platform and/or an M2M application.

According to an embodiment of the disclosure, the device further comprises: a second sending element, configured to, after the gateway deletes the registration information of the terminal peripheral stored by the gateway, send a deregistration confirmation message to the M2M service platform and/or the M2M application, wherein the deregistration confirmation message is used to indicate that the gateway has deregistered the terminal peripheral.

In the embodiments of the disclosure, the gateway can send the request message for deregistering the terminal peripheral to the terminal peripheral, so that the terminal peripheral is deregistered, and accordingly, the responding gateway will delete the locally stored registration information of the terminal peripheral in need of deregistration. By means of the above method, the technical problem of the storage resource waste in the related art is solved where the gateway cannot deregister the terminal peripheral, thereby achieving the technical effect of deregistering the terminal peripheral and saving the storage resource.

DESCRIPTION OF THE DRAWINGS

Drawings, provided for further understanding of embodiments of the disclosure and forming a part of the specification, are used to explain the disclosure together with embodiments of the disclosure rather than to limit the disclosure. In the drawings.

DESCRIPTION OF EMBODIMENTS

The disclosure is described below in detail by reference to the accompanying drawings in conjunction with embodiments. It should be noted that the embodiments and the characteristics of the embodiments can be combined with each other if no conflict is caused.

Figure 1:
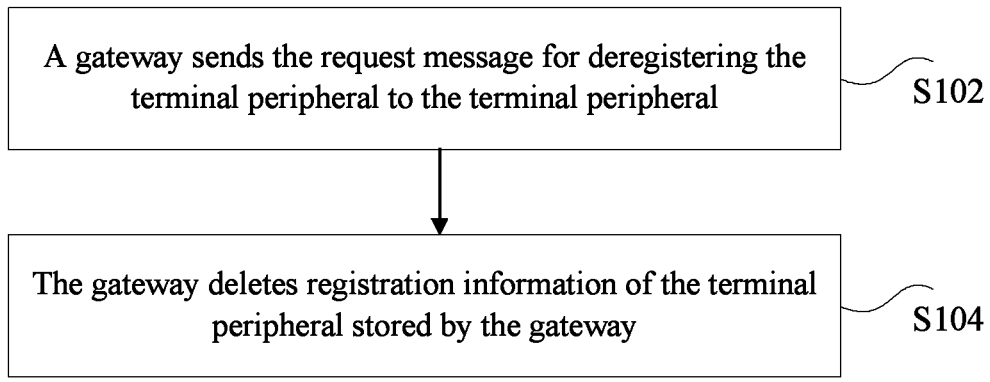
FIG. 1 shows an example flowchart of a method for deregistering a terminal peripheral according to an embodiment of the disclosure.

An example method for deregistering a terminal peripheral is provided in the embodiment of the disclosure, as shown in FIG. 1, the method comprises the following steps:

S102: A gateway sends the request message for deregistering the terminal peripheral to the terminal peripheral; and S104: The gateway deletes the registration information of the terminal peripheral stored by the gateway.

In this example embodiment, the gateway can send the request message for deregistering the terminal peripheral to the terminal peripheral, so that the terminal peripheral is deregistered, and accordingly, the gateway will delete the locally stored registration information of the terminal peripheral in need of deregistration. By means of the above method, the technical problem of the storage resource waste in the related art is solved where the gateway cannot deregister the terminal peripheral, thereby achieving the technical effect of deregistering the terminal peripheral and saving the storage resource.

Considering that there are various messages in a system or a network, the message can carry indication information for indicating that this message is a request message for deregistering the terminal peripheral. In order to make it known which terminal peripherals the deregistration request will be sent to, the request message for deregistering the terminal peripheral can carry an indication identifier of the terminal peripheral. In an example embodiment, the request message for deregistering the terminal peripheral can carry, but not limited to, indication information which indicates that this message is a request message for deregistering the terminal peripheral, and/or identification information which is used to identify the terminal peripheral of which the registration information needs to be deleted.

Figure 2:
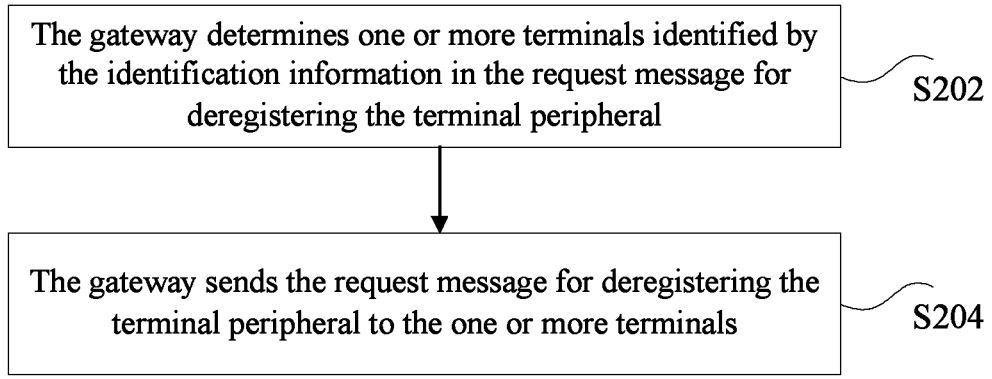
FIG. 2 shows an example flowchart of sending a request message for deregistering the terminal peripheral to the terminal peripheral according to an embodiment of the disclosure.

Accordingly, when the request message for deregistering the terminal peripheral carries the identification information of the terminal peripheral, the gateway can send the request message for deregistering the terminal peripheral to the terminal peripheral according to the method as shown in FIG. 2, which comprises the following steps:

S202: The gateway determines one or more terminals identified by the identification information in the request message for deregistering the terminal peripheral; i.e., the request message for deregistering the terminal peripheral may be refer to multiple terminal peripherals, and the multiple terminals can be regarded as a terminal peripheral group.

S204: The gateway sends the request message for deregistering the terminal peripheral to the one or more terminals.

The gateway should delete the registration information of the terminal peripheral stored by the gateway. However, sometimes the terminal peripheral perhaps may not successfully complete deregistration by itself, and for ensuring that all the terminal peripherals deleting registration information are the terminal peripherals which have already deleted local registration information, a deregistration confirmation message may be added (this message is sent to the gateway by the terminal peripheral after the terminal peripheral has deleted the registration information of the gateway locally stored by itself), and only after receiving the deregistration confirmation message, the gateway will delete the registration information of the terminal peripheral stored locally. In an example embodiment, the gateway deleting the registration information of the terminal peripheral stored by the gateway, comprises: based on that the gateway receives the deregistration confirmation message returned by the terminal peripheral, the gateway deletes the registration information of the terminal peripheral stored by the gateway, wherein the deregistration confirmation message is a message which is returned to the gateway by the terminal peripheral after receiving the request message for deregistering the terminal peripheral and deleting the registration information of the gateway stored by the terminal peripheral.

In an example embodiment, after the step S102, the terminal peripheral can execute the following steps:

S1: The terminal peripheral receives the request message for deregistering the terminal peripheral;

S2: The terminal peripheral deletes gateway the registration information of the gateway locally stored; and S3: The terminal peripheral returns the deregistration confirmation message to the gateway.

In the above various embodiments, the registration information of the gateway includes, but not limited to, a gateway identifier of the gateway and/or an identifier and/or address allocated for the terminal peripheral by the gateway.

Considering that sometimes the deregistration confirmation message sent by the terminal peripheral may not be received by the gateway, a timer can be set, and when the confirmation message is not received after a predetermined time arrives, at this time, the gateway may automatically delete the registration information of the terminal peripheral. In an example embodiment, the gateway deleting the registration information of the terminal peripheral stored by the gateway, further comprises: when the gateway receives no feedback of the deregistration confirmation message, and the predetermined time is up, the gateway automatically deletes the registration information of the terminal peripheral stored by the gateway.

The registration information of the terminal peripheral deleted by the gateway includes, but not limited to, an identifier of the terminal peripheral and/or an address of the terminal peripheral.

The request message for deregistering the terminal peripheral may be configured by the M2M gateway, or issued by the M2M service platform and/or the M2M application. In an example embodiment, before the gateway sends the request message for deregistering the terminal peripheral to the terminal peripheral, the method further comprises: the gateway receives the request message for deregistering the terminal peripheral which is sent from the M2M service platform and/or the M2M application.

When the request message for deregistering the terminal peripheral is issued by the M2M service platform and/or the M2M application, after the gateway confirms that the terminal peripheral has deleted the registration information, the gateway can send the deregistration confirmation message to the M2M service platform and/or the M2M application, wherein the deregistration confirmation message is used to indicate that the gateway has deregistered the terminal peripheral.

In the above various example embodiments, the above gateway is an M2M gateway in an M2M communication system.

Figure 3:
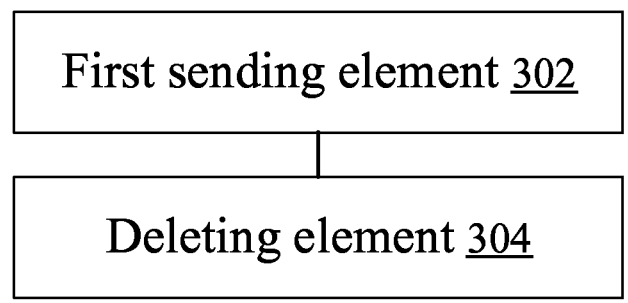
FIG. 3 shows an example structure diagram of a device for deregistering a terminal peripheral according to an embodiment of the disclosure.

A device for deregistering a terminal peripheral is provided in the embodiment of the disclosure, which is located in a gateway and is used to implement the above embodiments and example embodiments, which has been described and will not be explained here. As used below, the term "element" or "component" is a combination of software and/or hardware capable of implementing predetermined functions. Although the device described in the following embodiment may be preferably implemented by a software, it would be conceived to implement hardware or a combination of software and hardware. FIG. 3 shows an example structure diagram of a device for deregistering a terminal peripheral according to an embodiment of the disclosure, as shown in FIG. 3, the device comprises: a first sending element 302 and a deleting element 304. The structure will be described below.

The first sending element 302 is configured to send a request message for deregistering the terminal peripheral to the terminal peripheral; and the deleting element 304 is coupled with the first sending element 302 and configured to delete the registration information of the terminal peripheral stored by the gateway.

Figure 4:
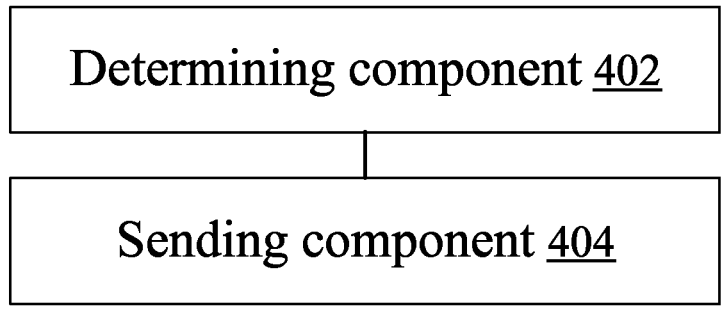
FIG. 4 shows an example structure diagram of the first sending element in the device for deregistering the terminal peripheral according to an embodiment of the disclosure.

In an example embodiment, as shown in FIG. 4, the above first sending element 302 comprises: a determining component 402 which is configured to determine one or more terminals identified by identification information in the request message for deregistering the terminal peripheral; and a sending component 404 which is configured to send the request message for deregistering the terminal peripheral to the one or more terminals.

In an example embodiment, the above deleting element 304 is further configured to, based on that the gateway receives the deregistration confirmation message returned by the terminal peripheral, delete the registration information of the terminal peripheral stored by the gateway, wherein the deregistration confirmation message is a message which is returned to the gateway by the terminal peripheral after receiving the request message for deregistering the terminal peripheral and deleting the registration information of the gateway stored by the terminal peripheral.

In an example embodiment, the above device further comprises: a receiving element which is configured to, before the gateway sends the request message for deregistering the terminal peripheral to the terminal peripheral, receive the request message for deregistering the terminal peripheral which is sent from an M2M service platform and/or an M2M application.

In an example embodiment, the above device further comprises: a second sending element which is configured to, after the gateway deletes the registration information of the terminal peripheral stored by the gateway, send a deregistration confirmation message to the M2M service platform and/or the M2M application, wherein the deregistration confirmation message is used to indicate that the gateway has deregistered the terminal peripheral.

An example embodiment to further describe the disclosure is provided in the embodiment of the disclosure. However, it should be noted that the example embodiment is only used to describe the disclosure, rather than improperly limit the disclosure.

In this embodiment, a method for actively triggering the deregistration of the terminal peripheral. The method mainly includes the following two implementation approaches:

Approach 1, which comprises the following steps:
S1: An M2M service platform or an M2M application sends a request message for deregistering the terminal peripheral to a gateway;

S2: The gateway sends the request message for deregistering the terminal peripheral to the terminal peripheral; and S3: The gateway deletes the information of the terminal peripheral.

Approach 2, which comprises the following steps:
S1: A gateway sends request message for deregistering the terminal peripheral to the terminal peripheral; and S2: The gateway deletes the information of the terminal peripheral.

The above two implementation approaches will be described below in conjunction with two specific embodiments.

EXAMPLE EMBODIMENT 1

Figure 5:
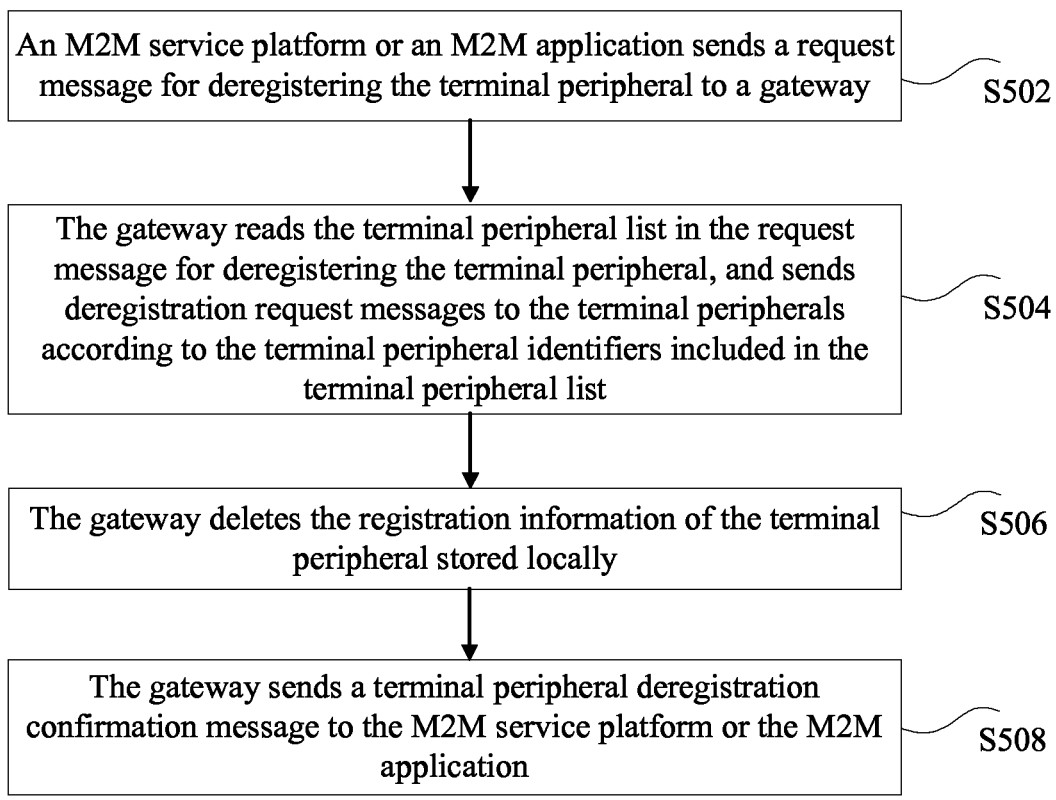
FIG. 5 shows an example flowchart of a method for automatically deregistering a terminal peripheral according to an example embodiment 1 of the disclosure.

In this embodiment, as shown in FIG. 5, a method for automatically deregistering a terminal peripheral comprises the following steps:

S502: An M2M service platform or an M2M application sends a request message for deregistering the terminal peripheral to a gateway.

The above request message for deregistering the terminal peripheral is as shown in Table 1, including: a protocol identifier and a terminal peripheral list.

TABLE 1

| Parameter | Note |
| --- | --- |
| Protocol Identifier | For identifying that the current message is "a request for deregistering the terminal peripheral" |
| Terminal Peripheral List | For setting the terminal peripheral required to be deregistered |

In an example embodiment, when there are multiple terminal peripherals required to be deregistered, there are multiple terminal peripheral identifiers in the terminal peripheral list.

S504: The gateway reads the terminal peripheral list in the request message for deregistering the terminal peripheral, and sends deregistration request messages to the terminal peripherals according to the terminal peripheral identifiers included in the terminal peripheral list.

As shown in Table 2, the above deregistration request message includes: a protocol identifier and a terminal peripheral identifier.

TABLE 2

| Parameter | Note |
| --- | --- |
| Protocol Identifier | For identifying that the current message is "deregistration request" |
| Terminal Peripheral Identifier | For setting the terminal peripheral required to be deregistered |

S506: The gateway deletes the registration information of the terminal peripheral stored locally, i.e., the gateway deletes the information corresponding to the terminal peripheral identifier included in the terminal peripheral list, the above information includes, but not be limited to, an identifier of the terminal peripheral and/or an address of the terminal peripheral.

S508: The gateway sends a terminal peripheral deregistration confirmation message to the M2M service platform or the M2M application.

As shown in Table 3, the above terminal peripheral confirmation message includes: a protocol identifier and a terminal peripheral list.

TABLE 3

| Parameter | Note |
|---|---|
| Protocol Identifier | For identifying that the current message is "a terminal peripheral deregistration confirmation" |
| Terminal Peripheral List | For setting the terminal peripheral which has been deregistered |

EXAMPLE EMBODIMENT 2

Figure 6:
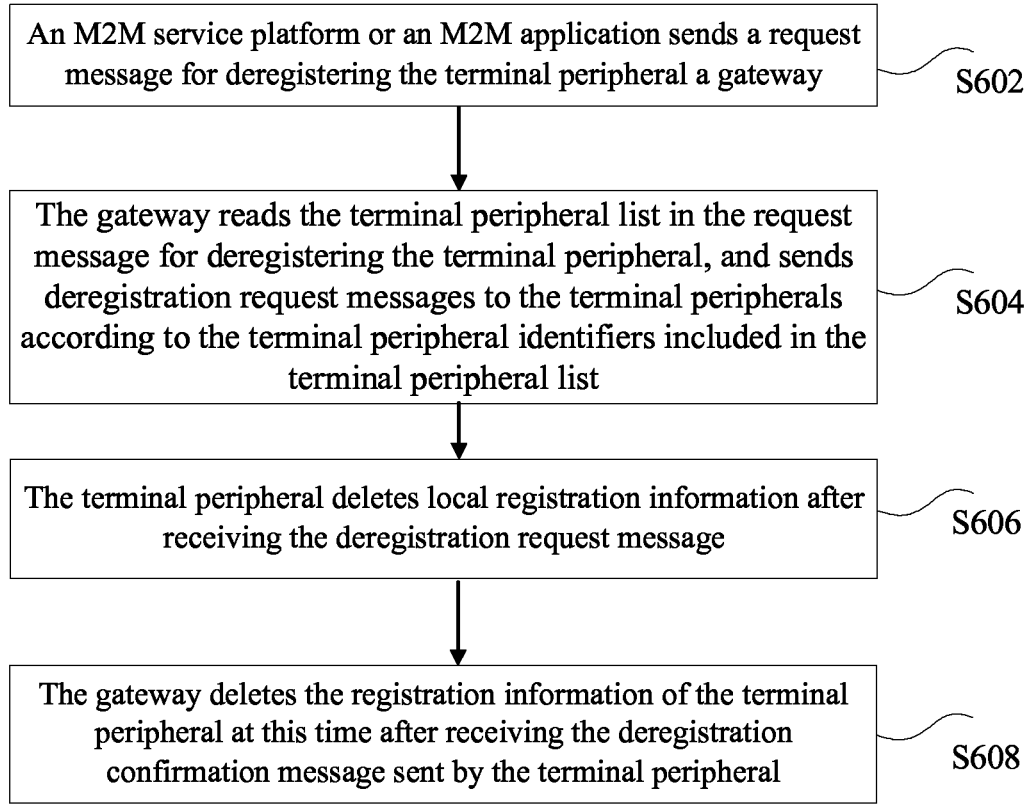
FIG. 6 shows an example flowchart of a method for automatically deregistering a terminal peripheral according to an example embodiment 2 of the disclosure.

In this embodiment, as shown in FIG. 6, a method for automatically deregistering a terminal peripheral comprises the following steps:

S602: An M2M service platform or an M2M application sends a request message for deregistering the terminal peripheral to a gateway.

As shown in Table 4, the above request message for deregistering the terminal peripheral includes: a protocol identifier and a terminal peripheral list.

TABLE 4

| Parameter | Note |
|---|---|
| Protocol Identifier | For identifying that the current message is "a request for deregistering the terminal peripheral" |
| Terminal Peripheral List | For setting the terminal peripheral required to be deregistered |

In an example embodiment, when there are multiple terminal peripherals required to be deregistered, there are multiple terminal peripheral identifiers in the terminal peripheral list.

S604: The gateway reads the terminal peripheral list in the request message for deregistering the terminal peripheral, and sends deregistration request messages to the terminal peripherals according to the terminal peripheral identifiers included in the terminal peripheral list.

As shown in Table 5, the deregistration request message includes: a protocol identifier and a terminal peripheral identifier.

TABLE 5

| Parameter | Note |
|---|---|
| Protocol Identifier | For identifying that the current message is "a deregistration request" |
| Terminal Peripheral Identifier | For setting the terminal peripheral required to be deregistered |

S606: The terminal peripheral deletes local registration information after receiving the deregistration request message, wherein the registration information includes, but not be limited to, a registered gateway identifier and an identifier or an address allocated by the gateway, and sends a deregistration confirmation message to the gateway.

As shown in Table 6, the above deregistration confirmation message includes: a protocol identifier and a terminal peripheral identifier.

TABLE 6

| Parameter | Note |
|---|---|
| Protocol Identifier | For identifying that the current message is "a deregistration confirmation" |
| Terminal Peripheral Identifier | For setting the terminal peripheral which has been deregistered |

S608: After receiving the deregistration confirmation message sent by the terminal peripheral, the gateway deletes the registration information of the terminal peripheral stored at this time, i.e., the gateway deletes the registration information corresponding to the terminal peripheral identifier included in the terminal peripheral list, the registration information includes, but not be limited to, an identifier of the terminal peripheral, an address of the terminal peripheral, etc. In an example embodiment, the gateway further sends a terminal peripheral deregistration confirmation message to the M2M service platform or M2M application.

As shown in Table 7, the above terminal peripheral deregistration confirmation message includes: a protocol identifier and a terminal peripheral list.

TABLE 7

| Parameter | Note |
|---|---|
| Protocol Identifier | For identifying that the current message is "a terminal peripheral deregistration confirmation" |
| Terminal Peripheral List | For setting the terminal peripheral which has been deregistered |

In an example embodiment, when the gateway does not receive the deregistration confirmation message sent from the terminal peripheral in a predetermined time, the gateway may delete the registration information of the terminal peripheral. The above predetermined time may be preconfigured in the gateway.

EXAMPLE EMBODIMENT 3

Figure 7:
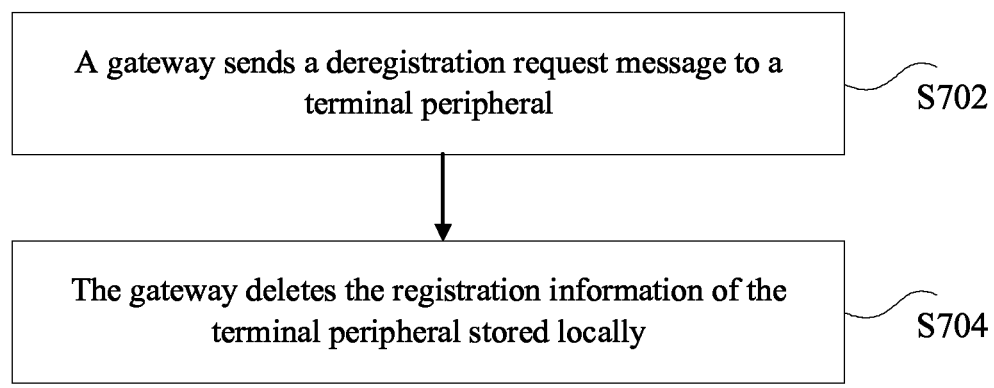
FIG. 7 shows an example flowchart of a method for automatically deregistering a terminal peripheral according to an example embodiment 3 of the disclosure.

In this embodiment, as shown in FIG. 7, a method for automatically deregistering a terminal peripheral comprises the following steps:

S702: A gateway sends a deregistration request message to a terminal peripheral.

As shown in Table 8, the above deregistration request message includes: a protocol identifier and a terminal peripheral identifier.

TABLE 8

| Parameter | Note |
|---|---|
| Protocol Identifier | For identifying that the current message is "a deregistration request" |
| Terminal Peripheral Identifier | For setting the terminal peripheral required to be deregistered |

S704: The gateway deletes the registration information of the terminal peripheral stored locally, the above registration information is the registration information corresponding to the terminal peripheral identifier included in the terminal peripheral list, and the registration information includes, but not be limited to, an identifier of the terminal peripheral and an address of the terminal peripheral.

EXAMPLE EMBODIMENT 4

Figure 8:
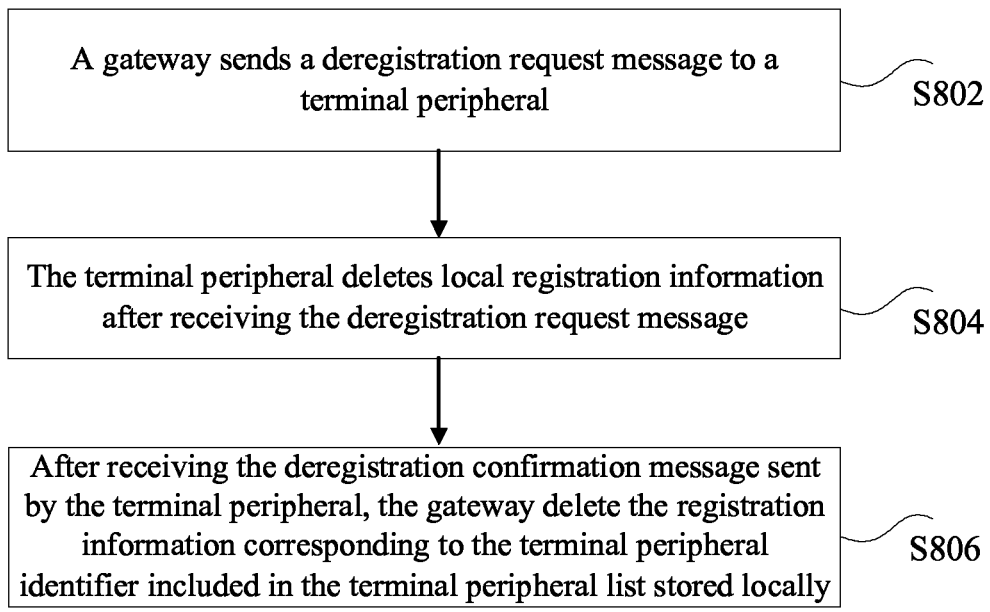
FIG. 8 shows an example flowchart of a method for automatically deregistering a terminal peripheral according to an example embodiment 4 of the disclosure.

In this embodiment, as shown in FIG. 8, a method for automatically deregistering a terminal peripheral comprises the following steps:

S802: A gateway sends a deregistration request message to a terminal peripheral.

As shown in Table 9, the above deregistration request message includes: a protocol identifier and a terminal peripheral identifier.

TABLE 9

| Parameter | Note |
|---|---|
| Protocol Identifier | For identifying that the current message is "a deregistration request" |
| Terminal Peripheral Identifier | For setting the terminal peripheral required to be deregistered |

S804: The terminal peripheral deletes local registration information after receiving the deregistration request message, wherein the registration information includes, but not be limited to, registered gateway identifier and an identifier or address allocated by the gateway, and sends a deregistration confirmation message to the gateway.

As shown in Table 10, the above deregistration confirmation message includes the following:

TABLE 10

| Parameter | Note |
|---|---|
| Protocol Identifier | For identifying that the current message is "a deregistration confirmation" |
| Terminal Peripheral Identifier | For setting the terminal peripheral which has been deregistered |

S806: After receiving the deregistration confirmation message sent by the terminal peripheral, the gateway deletes the registration information corresponding to the terminal peripheral identifier included in the terminal peripheral list stored locally, the registration information includes, but not be limited to, an identifier of the terminal peripheral and an address of the terminal peripheral.

In an example embodiment, when the gateway does not receive the deregistration confirmation message sent from the terminal peripheral in a predetermined time, the gateway deletes the registration information of the terminal peripheral.

In another embodiment, a software for executing the technical solution described in the above embodiments and example embodiments is further provided.

In another embodiment, a storage medium storing the above software is provided, and the storage medium includes but not be limited to: optical disk, floppy disk, hard disk, erasable memory, etc.

It can be seen from the above description that the embodiments of the disclosure achieved the following technical effects: the gateway can send the request message for deregistering the terminal peripheral to the terminal peripheral, so that the terminal peripheral is deregistered, and accordingly, the gateway will delete the locally stored registration information of the terminal peripheral required to be deregistered. By means of the above method, the technical problem of the storage resource waste in the related art is solved where a gateway cannot deregister a terminal peripheral, thereby achieving the technical effect of deregistering the terminal peripheral and saving the storage resource.

Obviously, a person skilled in the art would understand that the above modules and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. Thus, the disclosure is not limited to any particular combination of hardware and software.

The above description is only example embodiments of the disclosure and is not intended to limit the disclosure, and the disclosure can have a variety of changes and modifications for ordinary person skilled in the field. Any modification, equivalent replacement, or improvement made without departing from the principle of the disclosure should fall within the protection scope of the disclosure.

What is claimed is:

1. A method for deregistering a terminal peripheral, comprising:
   sending, by a gateway, a request message for deregistering a terminal peripheral to the terminal peripheral; and
   deleting, by the gateway, registration information of the terminal peripheral stored by the gateway;
   wherein before the gateway sends the request message for deregeristering the terminal peripheral to the terminal peripheral, the method further comprises:
   receiving, by the gateway, the request message for deregeristering the terminal peripheral sent from a Machine-to-Machine/Man (M2M) service platform and/or an M2M application.

2. The method according to claim 1, wherein the request message for deregistering the terminal peripheral carries indication information which indicates that this message is a request message for deregistering the terminal peripheral, and/or identification information which is used to identify the terminal peripheral of which the registration information needs to be deleted.

3. The method according to claim 1, wherein after the gateway sends the request message for deregistering the terminal peripheral to the terminal peripheral, the method further comprises:
   the terminal peripheral receiving the request message for deregistering the terminal peripheral;
   the terminal peripheral deleting registration information of the gateway stored locally; and
   the terminal peripheral returning a deregistration confirmation message to the gateway.

4. The method according to claim 3, wherein deleting, by the gateway, registration information of the terminal peripheral stored by the gateway comprises:
   based on that the gateway receives the deregistration confirmation message returned by the terminal peripheral, deleting, by the gateway, the registration information of the terminal peripheral stored by the gateway, wherein the deregistration confirmation message is a message which is returned to the gateway by the terminal peripheral after receiving the request message for deregistering the terminal peripheral.

5. The method according to claim 3, wherein the registration information of the gateway comprises: a gateway identifier of the gateway, and/or an identifier and/or address allocated for the terminal peripheral by the gateway.

6. The method according to claim 1, wherein deleting, by the gateway, the registration information of the terminal peripheral stored by the gateway further comprises:
when a predetermined time arrives, deleting, by the gateway, the registration information of the terminal peripheral stored by the gateway.

7. The method according to claim 1, wherein the registration information of the terminal peripheral comprises: an identifier of the terminal peripheral and/or an address of the terminal peripheral.

8. The method according to claim 1, wherein after the gateway deletes the registration information of the terminal peripheral locally stored by the gateway, the method further comprises:
sending, by the gateway, a deregistration confirmation message to the M2M service platform and/or the M2M application, wherein the deregistration confirmation message is used to indicate that the gateway has deregistered the terminal peripheral.

9. The method according to claim 1, wherein the gateway is an M2M gateway in an M2M communication system.

10. A device for deregistering a terminal peripheral, located in a gateway, comprising:
a first sending element, configured to send, a request message for deregistering a terminal peripheral to the terminal peripheral; and
a deleting element, configured to delete registration information of the terminal peripheral stored by the gateway;
a receiving element, configured to, before the gateway sends the request message for deregeristering the terminal peripheral to the terminal peripheral, receive the request message for deregeristering the terminal peripheral sent from a Machine-to-Machine/Man (M2M) service platform and/or an M2M application.

11. The device according to claim 10, wherein the deleting element is further configured to, based on that the gateway receives a deregistration confirmation message returned by the terminal peripheral, delete the registration information of the terminal peripheral stored by the gateway, wherein the deregistration confirmation message is a message which is returned to the gateway by the terminal peripheral after receiving the request message for deregistering the terminal peripheral and deleting registration information of the gateway stored by the terminal peripheral.

12. The device according to claim 10, wherein the device further comprises:
a second sending element, configured to, after the gateway deletes the registration information of the terminal peripheral stored by the gateway, send a deregistration confirmation message to the M2M service platform and/or the M2M application, wherein the deregistration confirmation message is used to indicate that the gateway has deregistered the terminal peripheral.

* * * * *